United States Patent
Imamura et al.

(10) Patent No.: US 6,563,993 B1
(45) Date of Patent: May 13, 2003

(54) LIGHT FIBER AND A METHOD FOR PRODUCING THE SAME

(75) Inventors: Kengo Imamura, Sagamihara (JP); Kenji Matsumoto, Yamato (JP); Shinichi Irie, Yamato (JP); Atsushi Udagawa, Sagamihara (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/762,912

(22) PCT Filed: Jun. 25, 1999

(86) PCT No.: PCT/US99/14429

§ 371 (c)(1),
(2), (4) Date: Feb. 9, 2001

(87) PCT Pub. No.: WO98/20279

PCT Pub. Date: May 14, 1998

(30) Foreign Application Priority Data

Aug. 10, 1998 (JP) .......................................... 10/226212

(51) Int. Cl.⁷ ................................................. G02B 6/02
(52) U.S. Cl. ...................................... 385/123; 362/558
(58) Field of Search ................................. 385/100–109, 385/123, 124, 147; 250/227.1; 362/558

(56) References Cited

U.S. PATENT DOCUMENTS

| | | | | |
|---|---|---|---|---|
| 5,416,608 A | * | 5/1995 | Ueda et al. | 250/227.11 |
| 5,997,571 A | * | 12/1999 | Farr et al. | 606/15 |
| 6,270,492 B1 | * | 8/2001 | Sinofsky | 606/13 |
| 6,301,418 B1 | * | 10/2001 | Freier et al. | 362/558 |

FOREIGN PATENT DOCUMENTS

| | | | | |
|---|---|---|---|---|
| JP | B-4-70604 | 5/1992 | | |
| JP | A-6-118244 | 4/1994 | | |
| WO | WO09/20279 | * | 5/1998 | 385/123 |
| WO | WO 98/20279 | 5/1998 | | |

* cited by examiner

Primary Examiner—Akm E. Ullah
(74) Attorney, Agent, or Firm—Stephen W. Buckingham

(57) ABSTRACT

A light fiber of directional side light extraction type capable of keeping the sectional shape as desired, reducing the undesirable light leakage to the outside through the light diffusive and reflective portion and extracting a highly directional and a highly bright light, and a process for manufacturing the same. Said object can be attained by co-extruding a resinous material only, and a material obtained by light scattering fine particles with a resinous material to disperse them therein so as to form a light diffusive and reflective film in a desired portion at least on the inner periphery of the clad.

8 Claims, 1 Drawing Sheet

LIGHT FIBER AND A METHOD FOR PRODUCING THE SAME

DETAILED DESCRIPTION OF THE INVENTION

Field of Invention

The present invention relates to a light fiber of directional side light extraction type capable of extracting a light from the sidewall and a process for producing the same. More particularly, it relates to a light fiber of directional side light extraction type capable of extracting a light in a specific direction from the sidewall and a production process thereof.

Discharge tubes such as fluorescent lamp emit a visible light of a particular wavelength region, they are ordinarily used in the application fields for lighting. In the case where the discharge tubes are a neon bulb, they are used to demonstrate an advertisement or decoration or the like in the form of the so-called neon sign.

The discharge tubes are luminescent with the application of electric voltage. Generally, the discharge tubes generate heat. In such a case, it is necessary to use the discharge tubes with due regard to an electric leakage and the generation of heat. For example, the use of discharge tubes is substantially impossible for under-water lighting or demonstration.

In recent years, however, a light-emitting device comprising a light source located at a distance from the area illuminated therewith has attracted attention to achieve the lighting and demonstration as set forth above. In the case of those light-emitting devices, a light fiber is installed in the vicinity of an area to be illuminated, away from the light source, so as to give the illumination of a desired light. Generally, the light fibers comprise a core in the central portion and a clad having a refractive index lower than that of the core on the periphery of the core. A light can be injected into one end and transmitted to the other end of thus configured light fiber.

Known among the light fibers is a light fiber of directional side light extraction type which can extract a light from the sidewall. Those light fibers of directional side light extraction type can extract parts of a light from the sidewall through the clad to the outside, when the light is injected into one end and transmitted to the other.

For example, a light fiber of directional side light extraction type which is disclosed in JP-A-6-118244 as a light-illuminating plastic optical fiber can leak lights from the whole or a designated part of the sidewall. More in detail, this light fiber is provided with a core and a clad which are made of transparent materials, respectively. The core comprises a polymer mainly composed of a polymethyl methacrylate. The clad is made of two different parts one of which is composed of a vinylidene fluoride-based copolymer comprising 50 to 90% by mole of vinylidene fluoride and 10 to 50% by mole of tetrafluoroethylene, and another part comprises at least one of the other polymers having a refractive index higher than that of the vinylidene fluoride-based copolymer, preferably a polymer which is the same as or close to the core-forming polymer. Thus, in portions of the clad wherein the vinylidene fluoride-based copolymer and the other polymer are contained, the clad and core are compatible each other on the interfacial boundary between them. In the interface between the core and the clad which are compatible, the light can not transmit in the core with total reflection, but scatters about within the clad; as a consequence, the light is extracted to the outside.

Furthermore, JP-A-10-142428 discloses a light-illuminating rod capable of extracting a light from the sidewall to a specific direction. This light-illuminating rod is basically provided with a flexible rod member serving as a core in the central portion and a transparent clad layer having a refractive index lower than that of the core and bonded to the outer periphery of the flexible rod member. A light diffusive and reflective film comprising a light transmitting polymer in which light diffusive and reflective fine particles are dispersed is present locally therebetween along the longitudinal direction of the rod member. This light diffusive and reflective film reflects at least parts of a light injected from one end of the light-illuminating rod member, diffusing and reflecting it to the outside from the radiation surface of the clad in the front of said light diffusive and reflective film.

On the other hand, JP-B-4-70604, and the like disclose inventions relating to light-illuminating rods comprising the inflexible rod members. A hardly flexible material such as quartz glass or optical glass is used as a rod member in those inventions. Furthermore, in those inventions, there is disposed in the shape of a stripe on the outer periphery along the longitudinal direction of the rod member a light diffusive and reflective film formed from a light transmitting polymer as a binder and fine powders having a refractive index higher than that of the rod member which have been incorporated into said polymer.

In the case of the light-illuminating plastic optical fiber disclosed in JP-A-6-118244, the two different polymers forming the clad are incompatible each other and caused a phase separation. Those two incompatible and phase-separated polymers have as little a refractive index difference as about 0.25 at most. In this light-illuminating plastic optical fiber, therefore, the clad cannot exhibit a light diffusive and reflective effect good enough to extract a highly bright light in a specific direction from the sidewall efficiently if an ordinary light source is used.

Generally, the light diffusive and reflective film disclosed in JP-A-10-142428 is formed by applying a coating material containing a light transmitting polymer and light diffusive and reflective fine particles to a rod member. Alternatively, if the light diffusive and reflective film is a light diffusive, reflective and adhesive film, it is laid directly on the rod member. However, those light diffusive and reflective films have a thickness of from 10 $\mu$m to 110 $\mu$m at most in the case of commercialized products because of various restrictive factors at the time of the production. Thus, at least parts of light which is injected into the flexible rod member from one end of the light-illuminating rod is leaked through those light diffusive and reflective films to the outside. Therefore, there is a fear that a highly bright light can hardly be extracted in a specific direction from the sidewall in high efficiency.

It is theoretically possible to provide the light-illuminating rods disclosed in said JP-A-publication with a light diffusive and reflective film having a high thickness. However, the attempts to do so are accompanied by various inconveniences. That is, if one intends to form a light diffusive and reflective film having a specific thickness by repeatedly applying a coating material to the core portion of a rod member, the process requires many man-hours and thus economically unacceptable. Although it depends upon the nature of coating materials to be used, a rod member having a sufficient flexibility as desired will not always be obtained. In the case where a light diffusive and reflective film is transferred and adhered to the core portion, a clad layer is formed on top of thus obtained film after the transfer and adhesion of said film. As a consequence, a heat-shrinkable type material may hardly be used. If it is used, a rod member having a cross section substantially in the shape of a circle can not be produced since the light diffusive and reflective film portion is partially protruded unlike in the case of the ordinary light-illuminating rods.

Furthermore, when they are used, the light-illuminating rods are generally mounted on a commercially available holder-rail having a reflective surface on the internal surface, such as U rail (white) manufactured by Sumitomo-3M, with the intentions to improve the directivity of the lights to be extracted to the outside or the like. Since the holder-rail is made to have the cross section in the shape of a circle which is the most popular cross section among the light-illuminating rods, it appears likely that the light-illuminating rods having a thick and protruded light diffusive and reflective film portion are not housed surely in the said holder-rail.

Therefore, an object of the present invention is to provide a light fiber of directional side light extraction type capable of keeping the cross-sectional shape as it is desired, reducing the amount of lights leaked through the light diffusive and reflective portion and extracting a light having a high brightness and a high directivity, and a process for producing the same.

The present inventors have made the intensive research in every way with a view to finding a solution in the problems as described above. As a result, it has been found that said object can be attained by forming a light diffusive and reflective portion such as a light diffusive and reflective film from, for example, a material obtained by mixing and dispersing light diffusive and reflective fine particles into a clad-forming resinous material; and said portion is formed at the inner periphery of a clad by co-extruding a resinous material only, and a mixture, for example, obtained by mixing light diffusive and reflective fine particles with a resinous material to disperse said fine particles therein at the time of forming a clad. The present invention has been completed on the basis of those findings.

According to the present invention, firstly, there is provided a light fiber comprising a core and a clad having a refractive index lower than that of the core on the periphery of the core, characterized in that the light fiber has a light diffusive and reflective portion formed by co-extrusion at least on the inner periphery of the clad;

secondly, there is provided a light fiber, characterized in that the diffusive and reflective portion comes into contact with the core;

thirdly, there is provided a light fiber, characterized in that the light diffusive and reflective portion has a thickness extending at least to the vicinity of outer periphery of the clad in a direction perpendicular to the longitudinal direction from the clad, fourthly, there is provided a light fiber, characterized in that the light diffusive and reflective portion is formed in a predetermined thickness extending from the inner periphery surface of the clad to the core portion in a direction perpendicular to the longitudinal direction of the clad;

fifthly, there is provided a light fiber, characterized in that the light diffusive and reflective portion extends into within the core;

Furthermore, sixthly, there is provided a light fiber, characterized in that the diffusive and reflective portion is formed a linear shape or a band-like shape along the longitudinal direction of the clad;

seventhly, there is provided a light fiber, characterized in that the light diffusive and reflective portion is formed along the peripheral direction of the clad, and eighthly, there is provided a method for producing a light fiber which comprises a core, a clad covering said core and a light diffusive and reflective portion, characterized in that a resinous material having a refractive index lower than that of the core-forming, light transmitting material, and a light diffusive and reflective material are co-extruded so as to form a light diffusive and reflective portion at least on the inner periphery of the clad.

Preferred Embodiments of the Invention

The present invention will be described below with reference to the preferred embodiments. Throughout all the drawings accompanied hereto, the same or similar parts or portions will be designated by the same symbol.

Figure 1:
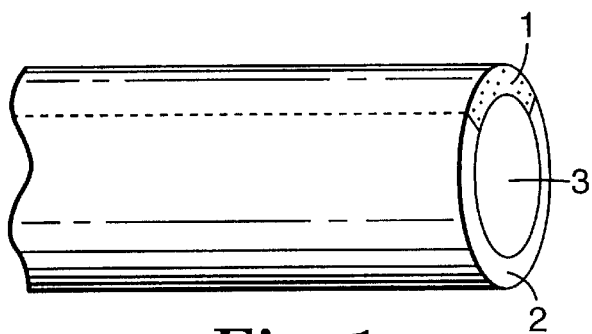
FIG. 1 is a schematic, perspective view of one embodiment of the light fibers according to the present invention.

FIG. 1 shows one embodiment of light fibers according to the present invention. Basically, the light fiber comprises the so-called core in the central portion and a clad having a refractive index lower than that of the core on the periphery thereof The core is formed from a solid mass of light transmitting materials such as quartz glass, optical glass; and polymers and it has a refractive index of 1.4 to 2.0. From the viewpoints of flexibility and transmittance of light, the core is preferably made of a flexible material described in Paragraph 0014 of JP-A-10-142428, for example, such as acrylic resins, ethylene-vinyl acetate copolymers and the like. The relevant descriptions of said laid-open publication are incorporated herein by reference. More preferably, the core is made of an acrylic resin having a refractive index of about 1.5.

A solid material is generally used as a core material, however, a liquid material is also usable. The liquid core material include aqueous solutions of an inorganic salt; polyhydric alcohols such as ethylene glycol, glycerin and the like; silicone oils such as polydimethyl siloxane, polyphenylmethyl siloxane and the like; polyethers; polyesters; hydrocarbons such as liquid paraffin; halo-genated hydrocarbons such as trifluoroethylenechloride oil; phosphoric esters such as tri(chloroethyl)phosphate, trioctylphosphate and the like; and polymer solutions prepared by diluting various polymers with appropriate solvents and the like.

The clad is made of a resinous material having a refractive index lower than that of the core-forming, light transmitting material such as, for example, tetrafluoroethylene. hexafluoropropylene.copolymer (hereinafter often referred to as FEP), tetrafluoroethylene ethylene copolymer (hereinafter often referred to as ETFE), or tetrafluoroethylene. hexafluoropropylene.vinylidene fluoride copolymer (hereinafter often referred to as THV) which has a refractive index of about 1.34 to about 1.43.

The light diffusive and reflective film (light diffusive and reflective portion) for the light fiber according to the present invention is formed in a desired size at a desired portion at least on the inner periphery of the clad by co-extruding a resinous material only for forming the clad, and a mixture obtained by incorporating, for example, light diffusive and reflective fine particles into the same resinous material as said resinous material so as to disperse them therein.

Thus obtained light diffusive and reflective film is formed in contact with the core suitably; in a thickness extending at least to the vicinity of the outer periphery of said clad in a direction perpendicular to the longitudinal direction of the clad, preferably, in a thickness extending as far as the outer periphery as shown in FIG. 1. Therefore, the maximum thickness of the film is equal to the thickness of the clad. Since the clad has typically a thickness of from 100 to 800 $\mu$m, the light diffusive and reflective film is able to have a thickness of from 100 to 800 $\mu$m. Thus, the clad of the present invention can be equipped with a light diffusive and reflective film thicker than that of the conventional ones, thereby the leakage of the light through the light diffusive and reflective film is prevented. As a consequence, the light fiber according to the present embodiment can efficiently diffuse and reflect a light which is transmitting within the core in a forward direction of the light diffusive and reflective film. As a consequence, a comparatively strong light is extracted only in a specific direction from the sidewall of the light fibers.

Figure 2:
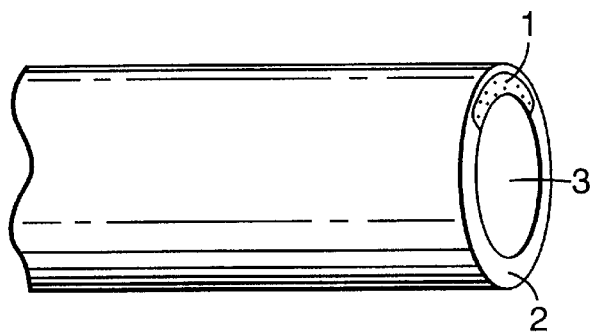
FIG. 2 is a schematic, perspective view of another embodiment of the light fibers according to the present invention.

Indeed, said light diffusive and reflective film can be formed in a predetermined thickness within a range which does not reach the thickness of the clad on the outer periphery or a thickness close thereto at its maximum in a direction perpendicular to the longitudinal direction of the clad, as shown in FIG. 2. When occasion demands, the light diffusive and reflective film may be formed, conversely in such a manner that said film extends towards the core portion in a direction perpendicular to the longitudinal direction of the clad from the inner periphery surface of said clad. In that case, the cross-section of the clad is in the shape of a circle having a protrusion that extends into the inner portion of the core. Furthermore, said film is formed being extended not only towards the core from the inner periphery surface of the clad, but also being extended into within the core portion. That is, said film can be embedded within the clad.

For the light diffusive and reflective film of the present invention, its width, thickness, length and shape can optionally be chosen, depending upon the fields of the use. For example, the maximum thickness of said film can be the same one as that for the clad itself, and the minimum thickness thereof can be equal to one tenth of the thickness of the clad. The width of said film may as well be optionally chosen. For example, it may have, in the same curvature as that of the clad, a width sufficient to satisfy the needs, and it may be a width good enough to cover 1% to 99% of the whole length of the outer periphery of the clad. The length of said film may as well be a length equivalent to the whole or a part of the longitudinally extending length of the light fiber. Said film may be a linear shape or, as occasion calls, a band-like shape having a protrusion part. The light diffusive and reflective film may not necessarily be used singly but a plurality of light diffusive and reflective films may be provided in parallel along the longitudinal direction of the clad.

A lighting with a broad coverage is attainable along the longitudinal direction of the light fiber by forming in a linear shape or a band-like shape said light diffusive and reflective film along the longitudinal direction of the clad, desirably as one having a length equivalent to the whole length of the clad.

Meanwhile, the light diffusive and reflective film of the present invention are formed integrally as a part of the clad, thus it does not give any effect on the cross sectional shape of the light fiber. Accordingly, said light fiber shows an essentially circular shape. Therefore, the light fibers of the present invention can easily be used in combination with a commercially available light reflective holder rail such as U rail (white) manufactured by Sumitomo-3M, whereby the light fiber can extract a light with an improved directivity to the outside.

Furthermore, the light diffusive and reflective film is preferably made to extend along the peripheral direction of the clad. Particularly, if the light diffusive and reflective film covers, along the peripheral direction of the clad, 50% to 99% of the whole length of the peripheral direction of the clad along said direction, the brightness of the light to be extracted in a specific direction is further intensified.

The light diffusive and reflective film is made of a light diffusive and reflective material obtained by incorporating light scattering fine particles which are explained hereinafter into a resinous material such as an FEP, ETFE resin and the like or polyethylene (PE) having a refractive index of about 1.34 to about 1.51 so as to disperse them uniformly therein. Said a light diffusive and reflective film is formed by co-extruding a preparation produced by adding to said resinous material the light scattering fine particles in an amount so as to be contained from 0.3 to 30% by weight. In the case of thus prepared light diffusive and reflective film, a light extracting from the sidewall of the light fiber can be quantitatively adjusted in proportion to the refractive index of resin and the amount of light scattering fine particles incorporated therein.

Figure 3:
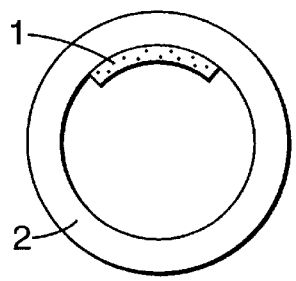
FIG. 3 is a schematic view of a variation of the clad composing the light fibers according to the present invention.

The light diffusive and reflective film of the present invention are not meant to be limited to the above-mentioned embodiment. For example, the light diffusive and reflective film do not necessarily have a thickness equal to the thickness of the clad, if it can otherwise prevent the light from leaking therethrough. As partially described above, the light diffusive and reflective film can be thinner than the clad as shown in FIG. 2, as long as the film can prevent the light from leaking through a part of the film. It is not always necessary that the light diffusive and reflective film should be formed to make a part of the clad integrally in the outer peripheral direction perpendicular to the longitudinal direction of the clad. The light diffusive and reflective film can be formed being protruded into the inner portion of the core from the inner periphery surface of the clad, as shown in FIG. 3. Furthermore, the light diffusive and reflective film may be colored by incorporating a pigment or a dyestuff thereinto.

Inorganic fine powder particles having a refractive index greater than that of the core-forming resin by about 0.3 to about 1.3 can suitably be used as the light diffusive and reflective fine particles. There can be given as an example thereof magnesium oxide having a refractive index of about 1.8; alumina having a refractive index of about 1.8; barium oxide having a refractive index of about 1.8; and titanium dioxide having a refractive index of about 2.6 and the like. The improvement in the weatherability and the broadening in the angle of visibility is also expected by incorporating light scattering fine particles such as titanium dioxide in a trace amount such as 0.03% by weight into the light transmitting portion of the clad as well.

Then, the process for producing the light fiber will be described below. The clad described as above is made, in the following way, by means of co-extrusion molding by extruding two or more materials with two or more extruders.

At first, a fluorine-based resin, for example, Teflon® FEP 100-J pellet manufactured by Du Pont in a predetermined amount and a fluorine-based resin composition containing the light scattering fine particles previously mixed and dispersed therein, for example, Neoflon® FEP NP20WH resin pellet containing 3% by weight of titanium dioxide and manufactured by Daikin Kogyo in a predetermined amount are prepared, respectively. As a matter of course, it is possible to use alternatively a material obtained by adding a predetermined amount of light scattering fine particles to an appropriate clad-forming resinous material so as to mix and disperse them therein.

Each of those pellets is respectively charged into two extruders prepared in advance, and extruded into a die, whereby a tubular clad having a light diffusive and reflective film mentioned above is molded integrally. Thus, a step of coating a light diffusive and reflective film or adhering an adhesive light diffusive and reflective film both of which are discussed in the section of the prior art is not called for.

Alternatively, the core can be produced, for example, in the following way. There is prepared firstly a mixed monomer solution containing a predetermined amount of 2-ethylhexyl-methacrylate, a predetermined amount of n-butylmethacrylate and a predetermined amount of triethyleneglycoldimethacrylate. Thereafter, bis (4-t-butylcyclohexyl) peroxydicarbonate is added to the mixed solution as a polymerization initiator to prepare a core precursor. Then, said clad is bent into the shape of U, and the core precursor is injected from one end into within the clad. Thereafter, a solid core is formed so as to provide a light fiber of directional side light extraction type by heating the resultant up to the polymerization initiation temperature.

Basically, the core precursor is heated serially from the bottom to the top of the U-shaped clad. In this step, the core precursor may come into contact with an inert gas such as nitrogen or argon so as to apply a pressure thereon. Thereafter, the core precursor may be heated as a whole, together with the clad, for a predetermined period of time to make the core precursor react completely.

EXAMPLES

The present invention will be described in detail below with reference to the following examples and comparative example and they should not be construed as limiting the present invention.

Example 1

Teflon® FEP 100-J pellets having a refractive index of about 1.34 and manufactured by Du Pont, and Neoflon® FEP NP20WH resin pellets comprising a binder composed of FEP having a refractive index of about 1.34 and 3% by weight of titanium dioxide and manufactured by Daikin Kogyo are charged, respectively into two extruders previously prepared. Thus charged materials were co-extruded into a die so as to give a tubular clad having an outside diameter of about 12 mm and a thickness of about 0.8 mm. The clad was found to be provided with a light diffusive and reflective film formed along the longitudinal direction of the clad; said film having a width of about 13 mm and a thickness of about 0.8 mm and containing 3% by weight of titanium dioxide.

Thereafter, 100 parts by weight of 2-ethylhexylmethacrylate, 100 parts by weight of n-butylmethacrylate and 2 parts by weight of triethyleneglycoldimethacrylate were mixed to obtain a mixed solution of monomers. To this mixed solution, bis (4-t-butylcyclohexyl)peroxydicarbonate was further added as a polymerization initiator to prepare a core precursor. Thereafter, said clad was bent into a shape of U, and the core precursor was poured from one end into within the clad. The resultant was heated up to the polymerization initiation temperature so as to form a solid core. In this way, an about 10 m long light fiber of directional side light extraction type was obtained.

Example 2

A light fiber was prepared by repeating the procedure of Example 1, except that a clad having an outside diameter of about 9 mm and a thickness of about 0.7 mm was produced by co-extrusion molding. In this case, a light diffusive and reflective film was formed in the clad along the longitudinal direction of the clad; said film having a width of about 10 mm and a thickness of about 0.7 mm and containing 3% by weight of titanium dioxide.

Example 3

A light fiber was prepared by repeating the procedure of Example 1, except that a clad having an outside diameter of about 18 mm and a thickness of about 0.8 mm was produced by co-extrusion molding. In this case, a light diffusive and reflective film was formed in the clad along the longitudinal direction of the clad; said film having a width of about 20 mm and a thickness of about 0.8 mm and containing 3% by weight of titanium dioxide.

Example 4

A light fiber was prepared by repeating the procedure of Example 1, except that Neoflon® FEP NP20WH resin manufactured by Daikin Kogyo was replaced by a mixture of 10 kg of said Teflon® FEP 1 00-J resin with 1 kg of said Neoflon® FEP NP20WR resin. A clad having an outside diameter of about 12 mm and a thickness of about 0.8 mm was produced by subjecting said mixture to co-extrusion molding. In this case, a light diffusive and reflective film was formed in the clad along the longitudinal direction of the clad; said film having a width of about 13 mm and a thickness of about 0.8 mm and containing 0.3% by weight of titanium dioxide.

Example 5

A light fiber was prepared by repeating the procedure of Example 1, except that Neoflon® FEP NP20WH resin manufactured by Daikin Kogyo was replaced by a mixture of 2 kg of said Teflon® FEP 100-J resin with 1 kg of said Neoflon® FEP NP20WH resin. A clad having an outside diameter of about 12 mm and a thickness of about 0.8 mm was produced by subjecting said mixture to co-extrusion molding. In this case, a light diffusive and reflective film was formed in the clad along the longitudinal direction of the clad; said film having a width of about 13 mm and a thickness of about 0.8 mm and containing 1% by weight of titanium dioxide.

Example 6

A clad having an outside diameter of about 12 mm and a thickness of about 0.8 $\mu$mm was prepared by charging said Teflon® FEP 100-J resin, and TFC SM-413 white resin containing a binder comprised of FEP having a refractive index of about 1.34 and 20% by weight of titanium dioxide and manufactured by Dai-nichi Seika Kogyo into 2 extruders of Example 1, respectively. In this case, a light diffusive and reflective film was formed in the clad; said film being as thin as about 0.1 mm, running along the longitudinal direction of the clad, having a width of about 13 mm, and containing 20% by weight of titanium dioxide.

Thereafter, a light fiber was produced, by using glycerin as a substitute for said core made of acrylic resin, by charging into the clad glycerin having a refractive index of about 1.475 that was almost equivalent to that of said core made of an acrylic resin so as to fill up within the clad therewith; and sealing the both ends of the clad with quartz rods.

Example 7

A light fiber was prepared by repeating the procedure of Example 6, except that said TFC SM-413 white resin manufactured by Dai-nichi Seika Kogyo was replaced by a mixture obtained by mixing 1 kg each of Teflon® FEP 110-J manufactured by Du Pont and TFC SM-413 white resin manufactured by Dai-nichi Seika Kogyo. A clad having an outside diameter of about 18 mm and a thickness of about 0.8 mm was produced by subjecting said mixture to co-extrusion molding. In this case, a light diffusive and reflective film was formed in the clad; said film being as thin as about 0.2 mm, running along the longitudinal direction of the clad, having a width of about 18 mm, and containing 10% by weight of titanium dioxide.

Example 8

A light fiber was prepared by repeating the procedure of Example 6, except that a clad having an outside diameter of about 18 mm and a thickness of about 0.8 mm was produced by charging Neoflon® ETFE EP521 resin manufactured by Daikin Kogyo having a refractive index of about 1.43 and AFC SM-412 white resin comprising a binder composed of ETFE having a refractive index of about 1.43 and 30% by weight of titanium dioxide, respectively into 2 extruders and subjecting said materials to co-extrusion molding. In this case, a light diffusive and reflective film was formed in the clad; said film being as thin as about 0.5 mm, running along the longitudinal direction of the clad, having a width of about 20 mm, and containing 30% by weight of titanium dioxide.

Example 9

A light fiber was prepared by repeating the procedure of Example 8, except that said AFC SM-412 white resin manufactured by Dai-nichi Seika Kogyo was replaced by a mixture of 1 kg of same AFC SM-412 white resin and 9 kg of Neoflon® ETFE EP521 resin manufactured by Daikin Kogyo. A clad having an outside diameter of about 18 mm and a thickness of about 1.3 mm was produced by subjecting said mixture to co-extrusion molding. In this case, a light diffusive and reflective film was formed in the clad; said film being as thin as about 0.5 mm, running along the longitudinal direction of the clad, having a width of about 20 mm and containing 3% by weight of titanium dioxide.

Example 10

A light fiber was prepared by repeating the procedure of Example 6, except that a clad having an outside diameter of about 18 mm and a thickness of about 0.8 mm was produced by charging fluorine-based polymer THV 500G having a refractive index of about 1.36 and manufactured by Sumitomo-3M, and a mixture comprising 5 kg of low density polyethylene LDPEI 122 μmanufactured by Chevron and of 1 kg of polyethylene PE-M98073 1 resin containing 60% by weight of titanium dioxide in LDPE and manufactured by Dai-nichi Seika Kogyo into 2 extruders, respectively, and subjecting said materials to co-extrusion molding. In this case, a light diffusive and reflective film was formed in the clad; said film being as thin as about 0.4 mm, running along the longitudinal direction of the clad, having a width of about 20 mm and containing 10% by weight of titanium dioxide in LDPE having a refractive index of about 1.51.

Example 11

A light fiber was prepared by repeating the procedure of Example 6, except that a clad having an outside diameter of about 18 mm and a thickness of about 0.9 mm was produced by charging a mixture of 10 kg of Teflon FEP 100-J resin and 0.1 kg of Neoflon FEP NP20WH resin manufactured by Daikin Kogyo, and the above-mentioned Neoflon FEP NP20WH manufactured by Daikin Kogyo, respectively into 2 extruders; and subjecting said materials to co-extrusion molding. In this case, a light diffusive and reflective film was formed in the clad; said film being as thin as about 0.5 mm, running along the longitudinal direction of the clad, having a width of about 22 mm and containing 3% by weight of titanium dioxide.

Example 12

A light fiber was prepared by repeating the procedure of Example 6, except that a clad having an outside diameter of about 9 mm and a thickness of about 0.7 mm was obtained by charging Teflon FEP 100-J resin and Neoflon FEP NP20WH resin, respectively, into 2 extruders, and subjecting said materials to co-extrusion molding. In this step, a light diffusive and reflective film was formed in the clad; said film running along the longitudinal direction of the clad, having a width of about 21 mm and a thickness of about 0.7 mm and containing 3% by weight of titanium dioxide.

Example 13

A light fiber was prepared by repeating the procedure of Example 12, except that AFC SM-415 white resin containing a binder comprised of FEP having a refractive index of about 1.34 and 10% by weight of titanium dioxide, and manufactured by Dai-nichi Seika Kogyo was used as a substitute for Neoflon FEP NP20WH resin to form a clad having an outside diameter of about 12 mm and a thickness of about 0.8 mm by means of co-extrusion molding. In this step, a light diffusive and reflective film was formed along the longitudinal direction from in the clad thus obtained clad; said film having a width of about 1 mm and a thickness of about 0.8 mm and containing 10% by weight of titanium dioxide.

Comparative Example 1

A dispersion was prepared by adding 3 g of Tipaque® CR-90 titanium dioxide manufactured by Ishihara Techno to a solution of 97 g of said fluorine-based polymer THV200P having a refractive index of about 1.36 and manufactured by Sumitomo-3M in 388 g of ethyl acetate, and dispersing the materials by a sand mill. Thereafter, the dispersion was applied to a Purex® G1W release liner manufactured by Teijin to form a 21 μm thick light diffusive and reflective film containing 3% by weight of titanium dioxide.

Furthermore, an ethyl acetate solution(a solid content of 30%) of a copolymer made of 2-ethylhexylacrylate and acrylic acid in a weight ratio of 90:10 and having a refractive index of about 1.472 was coated onto Purex® G1W release liner to form a 5 μm thick adhesive layer. Then, thus formed adhesive layer was laminated on said light diffusive and reflective film.

Thus obtained light diffusive and reflective film having the adhesive layer was cut into 20 mm wide strips. Meanwhile, a core having a refractive index of 1.481 and a diameter of 18 mm was taken out of a 1 m long light fiber LF181 manufactured by Sumitomo-3M, and the light diffusive and reflective films in the shape of a strip was stuck partially onto the core along its longitudinal direction. Then, the core with the strip-shaped light diffusive and reflective film stuck thereto was covered by a heat-shrinkable FEP tube NF-170 manufactured by Junkosha having a thickness of 0.35 mm to obtain a 21 μm thick light fiber having a light diffusive and reflective film in the shape of a white strip.

The light fibers obtained as above were evaluated. The evaluation was carried out as to the brightness and illuminance of a light extracted from the sidewall of the light fibers.

Measurement of Brightness

Figure 4:
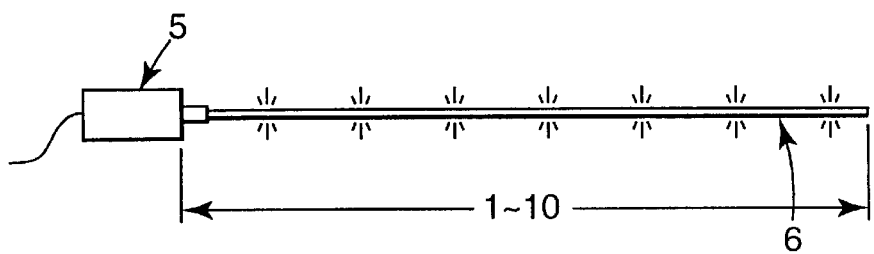
FIG. 4 is a cross-sectioned side view of a device used in the measurement of brightness according to the present invention.

The brightness was measured in the way as shown in FIG. 4. One end of the respective light fibers according to said Examples and Comparative Example was respectively connected with a metal halide lamp LBM130H manufactured by Sumitomo-3M as the light source. A Minolta brightness meter CS-100 (not depicted) was disposed at a predetermined distance of 0.1 to 10 m from the light source to measure the brightness. Thereupon, the brightness meter was positioned at the site 60 cm away from the light fiber. The light leaked from the sidewall opposite to the site of sticking the light diffusive and reflective film to the core was also measured by using same measuring method at the predetermined distance.

Furthermore, in the case of the purpose of measuring the brightness as described above, the performance of the clad tube according to the present invention can be evaluated by using a light fiber produced, without passing through the polymerization step, as in the case, especially the ones like Examples 6 to 13 in which glycerin was used as a core.

TABLE 2

Results of Brightness Measurement (Unit: cd/m$^2$)

| Distance from light source (m) | | 0.1 | 0.2 | 0.3 | 0.5 | 0.7 |
|---|---|---|---|---|---|---|
| Example 6 | Extraction | 40000 | 19300 | 11800 | 7940 | 3860 |
| | Leakage | 4350 | 950 | 832 | 341 | 220 |
| Example 7 | Extraction | 26400 | 19800 | 16300 | 13200 | 9230 |
| | Leakage | 3040 | 1930 | 1550 | 1200 | 861 |
| Example 8 | Extraction | 43700 | 17400 | 9400 | 3840 | 1720 |
| | Leakage | 1150 | 457 | 184 | 98 | 27 |
| Example 9 | Extraction | 29900 | 18000 | 13300 | 5070 | 3300 |
| | Leakage | 1980 | 892 | 742 | 521 | 283 |
| Example 10 | Extraction | 51000 | 25900 | 16300 | 6480 | 1930 |
| | Leakage | 2910 | 1890 | 464 | 248 | 135 |
| Example 11 | Extraction | 19100 | 15200 | 13600 | 8740 | 6730 |
| | Leakage | 1180 | 938 | 831 | 585 | 500 |
| Example 12 | Extraction | 48600 | 33400 | 23300 | 12500 | 9540 |
| | Leakage | 1280 | 801 | 612 | 309 | 212 |
| Example 13 | Extraction | 24700 | 19600 | 17800 | 15500 | 11700 |
| | Leakage | 2570 | 2360 | 1870 | 1730 | 1750 |

The results of the brightness measurement was shown in Tables 1 and 2. According to Tables 1 and 2, it was found that the light fiber of Comparative Example leaked, through the light diffusive and reflective portion, light in an extent similar to that extracted when the light fiber extracted light in the forward direction by means of the light diffusive and reflective portion. On the contrary, in all the light fibers of said Examples, the brightness of the light leaked through the light diffusive and reflective portion was found to be, at most, 25% or lower of the brightness of the total light when the light fiber extracted it in the forward direction from the light diffusive and reflective portion. Thus, it was also found that the light fibers of the present invention could reduce the light leakage through the light diffusive and reflective portion, extracting a comparatively strong light only in a specific direction from the sidewall. Those light fibers can be used for the application fields wherein a light having a high brightness is required, such as for example, as a substitute for neon sign.

Measurement of Illuminance

There is, as the application fields for the light fiber of directional side light extraction type according to the present invention, the ones wherein the illuminance in an area illuminated therewith are important, other than those

TABLE 1

Results of Brightness Measurement of Light Fiber (Unit: cd/cm$^2$)

| | Distance From light source (m) | 0.1 | 0.2 | 0.3 | 0.5 | 0.7 | 1 | 2 | 3 | 5 | 10 |
|---|---|---|---|---|---|---|---|---|---|---|---|
| Example 1 | Extraction | 21300 | 15100 | 12300 | 11900 | 9680 | 5120 | 2310 | 1150 | 416 | 118 |
| | Leakage | 600 | 671 | 290 | 361 | 237 | | | | | |
| Example 2 | Extraction | 14800 | 12500 | 12300 | 8450 | 6900 | 5170 | 2330 | 1120 | 353 | 92 |
| | Leakage | 437 | 482 | 346 | 360 | 189 | | | | | |
| Example 3 | Extraction | 20000 | 12200 | 11700 | 9840 | 9460 | 5780 | 3160 | 1780 | 997 | 330 |
| | Leakage | 418 | 227 | 186 | 140 | 110 | | | | | |
| Example 4 | Extraction | 3970 | 3920 | 3530 | 3250 | 3020 | 2270 | 1830 | 1440 | 1050 | 528 |
| | Leakage | 973 | 872 | 750 | 583 | 466 | | | | | |
| Example 5 | Extraction | 7290 | 6130 | 4860 | 4660 | 4280 | 3040 | 2350 | 1730 | 1010 | 486 |
| | Leakage | 638 | 462 | 403 | 352 | 333 | | | | | |
| Comparative Example 1 | Extraction | 11200 | 9750 | 9540 | 6510 | 6980 | | | | | |
| | Leakage | 11200 | 8280 | 7820 | 4130 | 5180 | | | | | | wherein the brightness thereof is important as a yardstick for the performance of the light fiber, like the case with neon sign to take a look at directly with eyes. In order to evaluate the performance when the light fiber is used in such a field, the illuminance on a floor space (30 cm below) just under a point 50 cm away from the light source in the lengthwise direction of the light fiber was measured by using Minolta illuminometer T-1H, with lighting the light fibers of directional side light extraction type which had been cut 1 m long in Example 3 and Comparative Example 1 on one of whose end a reflecting mirror was pasted and on the other end of which was connected with a light source LBM130H and disposed horizontally on the height of 30 cm from the floor, respectively. The results are shown in Table 3.

TABLE 3

Results of Illuminance Measurement
(Unit:lux)

| | |
|---|---|
| Example 3 | 1330 |
| Comparative Example 1 | 820 |

In the case of the light fiber of Comparative Example 1, it leaked a great deal of light, as is evident from Table 3, since the thickness of the light diffusive and reflective film in the shape of white stripes was as thin as 21 μm. As a consequence, it has been found that the illuminance was very low when compared with Example 3 whose light diffusive and reflective film had a thickness of 0.8 mm.

As evident from above, the leakage of light through the light diffusive and reflective film is reduced since the light fiber according to the present invention has a comparatively thick light diffusive and reflective film that is formed by co-extrusion molding at least on the inner periphery of the clad, whereby a comparatively strong light can be extracted in a specific direction from the sidewall of the light fibers.

What is claimed is:

1. A light fiber which comprises a core and a clad having a refractive index lower than that of said core on the periphery of said core, characterized in that said light fiber has a light diffusive and reflective portion formed by co-extrusion at least on the inner periphery of said clad, wherein a brightness of light from the core leaked through the light diffusive and reflective portion is less than about 25% of a brightness of light from the core extracted in a forward direction from the light diffusive and reflective portion.

2. A light fiber according to claim 1, characterized in that said light diffusive and reflective portion comes into contact with said core.

3. A light fiber according to claim 1 or 2, characterized in that said light diffusive and reflective portion has a thickness extending at least to the vicinity of outer periphery of said clad in a direction perpendicular to the longitudinal direction of said clad.

4. A light fiber according to any one of claims 1 to 3, characterized in that said light diffusive and reflective portion is formed in a predetermined thickness extending from the inner periphery surface of said clad to the core portion in a direction perpendicular to the longitudinal direction of said clad.

5. A light fiber according to any one of claims 1 to 4, characterized in that said light diffusive and reflective portion extends into within said core.

6. A light fiber according to any one of claims 1 to 5, characterized in that said light diffusive and reflective portion is formed in a linear shape or a band-like shape along the longitudinal direction of said clad.

7. A light fiber according to any one of claims 1 to 6, characterized in that said light diffusive and reflective portion is formed along the peripheral direction of said clad.

8. A method for producing a light fiber which comprises a core, a clad covering said core and a light diffusive and reflective portion, characterized in that said light diffusive and reflective portion is formed at least on the inner periphery of said clad by co-extruding a resinous material having a refractive index lower than that of a core-forming, light transmitting material and a light diffusive and reflective material.

* * * * *

UNITED STATES PATENT AND TRADEMARK OFFICE
CERTIFICATE OF CORRECTION

PATENT NO. : 6,563,993 B1
DATED : May 13, 2003
INVENTOR(S) : Imamura, Kengo

It is certified that error appears in the above-identified patent and that said Letters Patent is hereby corrected as shown below:

Column 8,
Line 36, delete "1 00-J" and insert -- 100-J --
Line 37, delete "WR" and insert -- WH --
Line 62, delete "$\mu$mm" and insert -- mm --

Column 9,
Line 67, delete "LDPEI 122" and insert -- LDPE 1122 --

Column 10,
Line 1, delete "PE-M98073 1" and insert -- PE-M980731 --

Signed and Sealed this

Twenty-sixth Day of April, 2005

JON W. DUDAS
*Director of the United States Patent and Trademark Office*